(12) United States Patent
McKenna et al.

(10) Patent No.: US 6,237,237 B1
(45) Date of Patent: May 29, 2001

(54) MULTI-PURPOSE PLUMBING AND MEASURING APPARATUS

(76) Inventors: James M. McKenna, 4055 Brixham Way, Alpharetta, GA (US) 30302; John T. O'Keefe, 705 High Point Trail, Woodstock, GA (US) 30188

( * ) Notice: Subject to any disclaimer, the term of this patent is extended or adjusted under 35 U.S.C. 154(b) by 0 days.

(21) Appl. No.: 09/151,438

(22) Filed: Sep. 11, 1998

Related U.S. Application Data

(60) Provisional application No. 60/058,632, filed on Sep. 12, 1997.

(51) Int. Cl.$^7$ .................................. G01C 9/00; B43L 7/10
(52) U.S. Cl. .................................. 33/374; 33/451; 33/464
(58) Field of Search .......................... 33/374, 404, 406, 33/451, 464, 806, 809, 810, 811, 812, 390

(56) References Cited

U.S. PATENT DOCUMENTS

| | | | |
|---|---|---|---|
| 2,551,524 | * | 5/1951 | Bullivant ................................. 33/374 |
| 3,832,782 | * | 9/1974 | Johnson et al. ........................ 33/451 |
| 4,152,838 | * | 5/1979 | Cook ...................................... 33/374 |
| 4,607,437 | * | 8/1986 | McSorley, Sr. et al. .............. 33/374 |
| 4,894,925 | * | 1/1990 | Langmaid ............................. 33/374 |
| 4,928,395 | * | 5/1990 | Good ..................................... 33/374 |
| 5,412,875 | * | 5/1995 | Hilderbrandt ......................... 33/374 |

* cited by examiner

*Primary Examiner*—Christopher W. Fulton
(74) *Attorney, Agent, or Firm*—Troutman Sanders LLP; Wm. Brook Lafferty

(57) ABSTRACT

An apparatus for measuring and plumbing. The apparatus contains a slide element slidably mounted to a body element. The body element is fixed to a base element. The slide element defines a viewing channel for viewing a side level fixed to the body element. The slide element has a pair of longitudinal trapezoidal rails fixed to the back of the slide element and running its length. The body element has a pair of longitudinal trapezoidal channels along the front of the body element. The channels within the body element receive the rails of the slide element to slidably fix the slide element to the body element. The slide element may be moved along the body element to a set position, the apparatus aligned, and the slide element locked into place for measuring or plumbing.

9 Claims, 8 Drawing Sheets

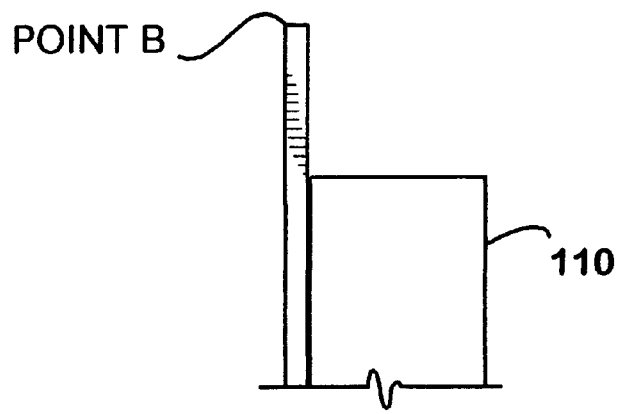
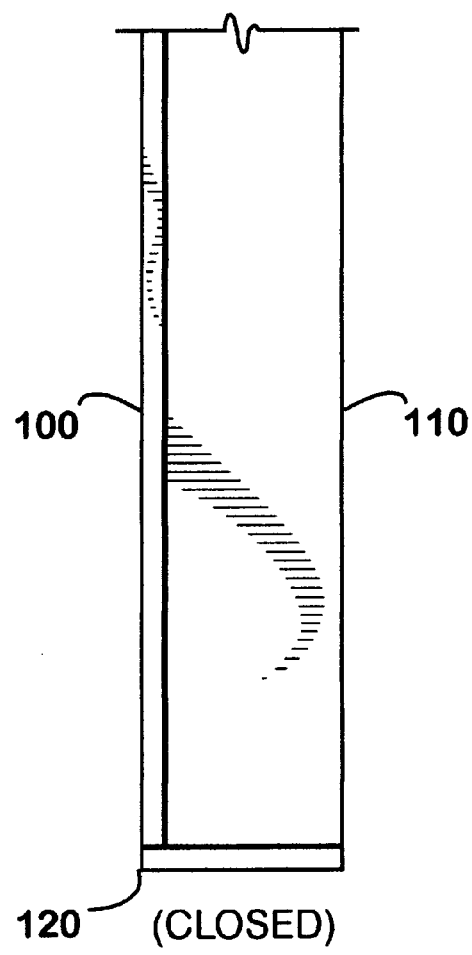
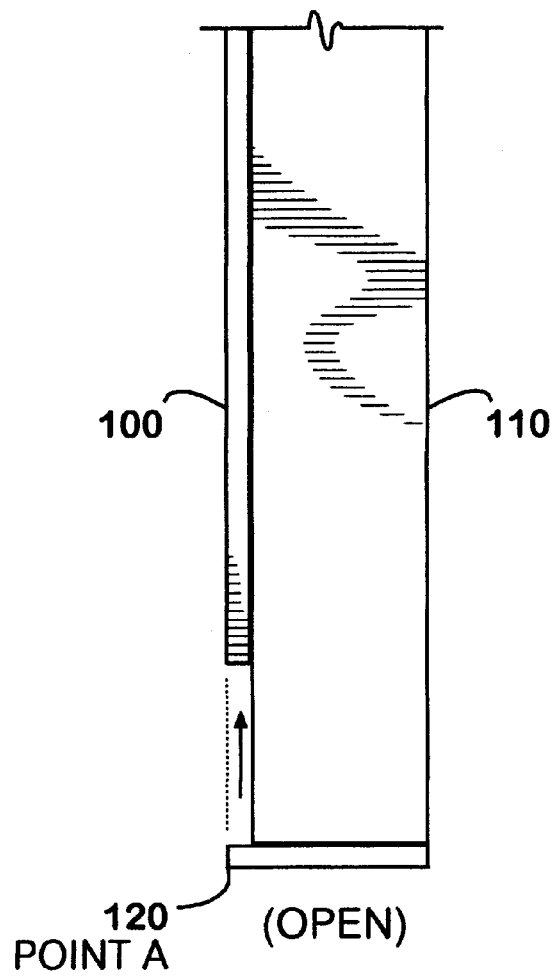
FIG.10A FIG.10B

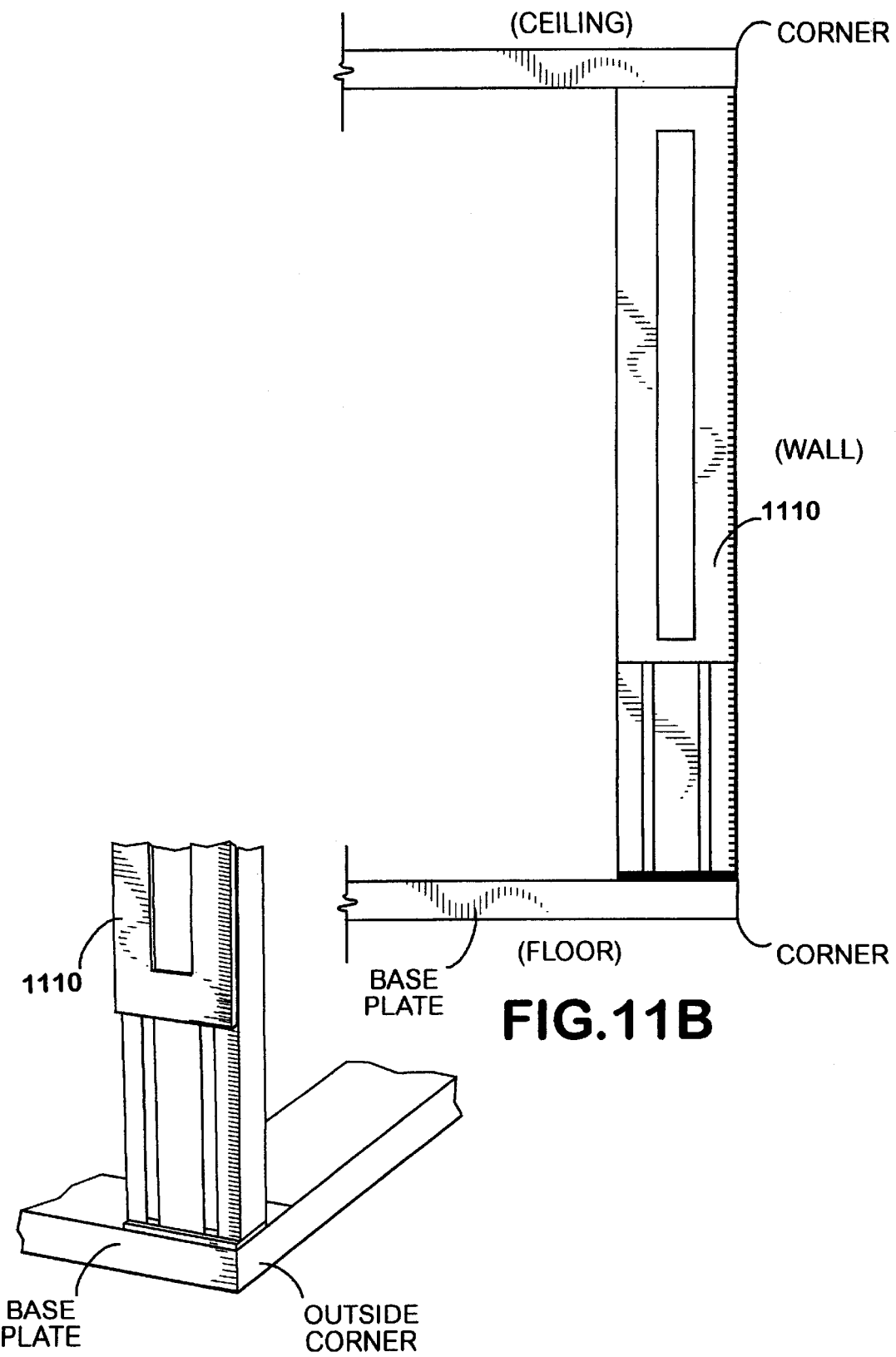

MULTI-PURPOSE PLUMBING AND MEASURING APPARATUS

This application claims priority of U.S. Provisional Application Ser. No. 60/058,632, filed Sep. 12, 1997.

TECHNICAL FIELD

The present invention relates to precision measuring devices and, more particularly, to a device for accurately providing a plumb line, measurements, leveling, and a straight edge.

BACKGROUND OF THE INVENTION

The process of plumbing involves projecting a straight line between two points. In the fields of construction, woodworking, and other similar activities, it is often necessary to perform a plumbing function. One technique that is prevalent in the field of construction is the use of a plumb bob. A plumb bob consists of a string with a weight, such as a lead bob, tied to one end. In operation, the end of the string without the weight is held against an upper surface in such a way that the weight is suspended just above a lower surface. By moving the weight directly over a particular point on the lower surface, the point on the upper surface directly above the point on the lower surface can be determined. One problem associated with a standard string plumb bob is that it can be awkward to use and control. For instance, it may require two people to accurately use and control a string plumb bob especially from substantial heights. One person is required to be on a ladder while the other person steadies the weight and takes an accurate reading.

What is needed is an apparatus for accurately making a plumb line by an individual without the need for any assistance. In addition, a device is needed to make a plumb line that is easy to use. An apparatus is also needed that allows the accurate measurement of heights by an individual.

SUMMARY

The present invention is drawn to a multi-purpose apparatus for plumbing and measuring. A slide element is slidably mounted to a body element. The body element is attached to a base unit. Both the slide element and the body element have measuring striations. A side level and a top level are mounted on the apparatus. In practice, the base of the apparatus is positioned against a corner or floor. The slide element is slid upwards until contact is made with either the ceiling or joist. Viewing the side and top levels, the apparatus is leveled until plumb. The slide is then pushed slightly harder to assure stability and locked into place. The apparatus will now be fixed in place allowing measurements and markings to be performed. Notice that placement, measuring and marking can all be performed by a single individual.

BRIEF DESCRIPTION OF THE DRAWINGS

FIG. 10 is a drawing illustrating the operation of an exemplary embodiment of the present invention.

FIG. 10A illustrates an exemplary embodiment in the closed position.

FIG. 10B illustrates an exemplary embodiment in the open position.

FIG. 11 is an elevated view illustrating an exemplary embodiment of the present invention being used as a plumbing device and a measuring device between a ceiling and a floor.

FIG. 11A is a perspective view of a fragmentary portion of the bottom portion of the device of FIG. 11.

FIG. 11B is a perspective view of a fragmentary portion of the device of FIG. 11.

DETAILED DESCRIPTION OF AN EXEMPLARY EMBODIMENT

The present invention is directed towards providing a tool to perform the functions of plumbing between two surfaces and measuring the distance between two surfaces. Embodiments of the present invention can be used in place of a standard string plumb bob, tape measures, or other similar devices. In addition, the present invention can be used as a measuring device, a level, and a straight edge. Thus, embodiments of the present invention are functional in obtaining accurate, reliable, and precise measurements and plumbing functions. The present invention can conveniently be embodied with materials, such as steel, aluminum, composites or plastics, so that the various embodiments are strong and durable. In general, the present invention is constructed similar to a standard slide rule having two interconnected elongated members that are slideably mounted to each other.

Figure 1:
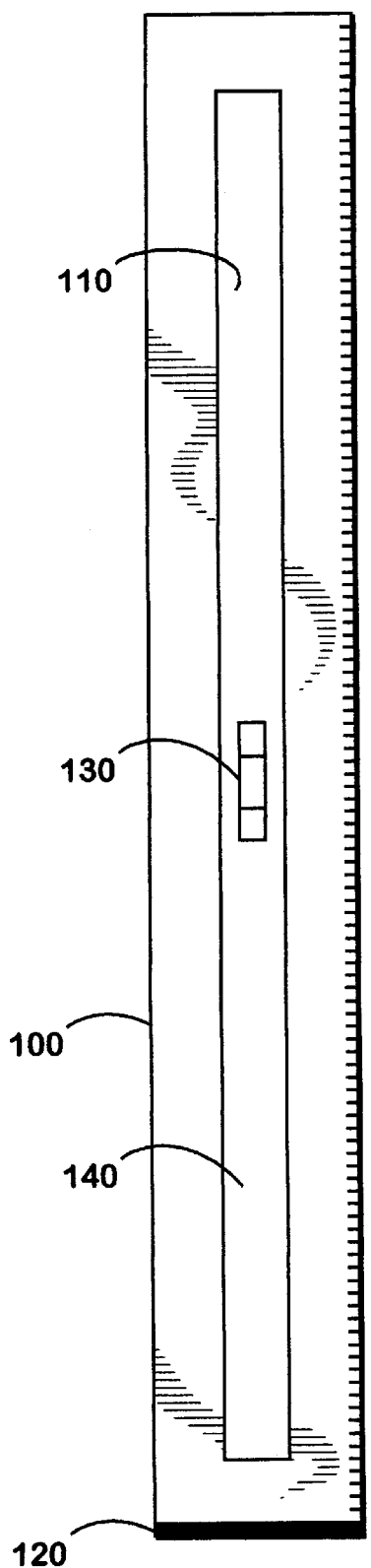
FIG. 1 is a drawing illustrating the front view of an exemplary embodiment of the present invention.

FIG. 1 is a drawing illustrating the front view of an exemplary embodiment of the present invention. The exemplary embodiment of the present invention includes a slide element 100, a body element 110, a base element 120, a side level 130, and a viewing channel 140. The slide element 100 is substantially a rectangular shape and extends substantially five feet in a first direction and substantially 2½ inches in a second direction. The body element 110 is substantially a rectangular shape with substantially the same dimensions as the slide element 100. The slide element 100 is slideably mounted to the body element 110. The slide element 100 has a top 210, a bottom 220, an inner surface 230 and an outer surface 240. The body element 110 has a top surface 530, bottom surface 540, front surface 550, and back surface 560.

The slide element 100 can be slid from a fully retracted position to a fully extended position, or positioned anywhere between these two positions. In the fully retracted position, as is illustrated in FIG. 1, the top 210 of the slide element 100 is positionally related to the top surface 530 of the body element 110. Similarly, in the retracted position, the bottom 220 of the slide element 100 is positionally related to the bottom surface 540 of the body element 110.

The slide element 100 defines a substantially rectangular shaped viewing channel 140 extending from near the bottom of the slide element 100 to near the top of the slide element 100. Thus, the slide element 100 defines a border around the viewing channel 140. As illustrated in FIG. 1, the front surface of the body element 110 can be viewed through the viewing channel 140 when the slide element 100 is in the retracted position. The body element 110 includes a side level 130 that is fixedly mounted in such a way that it can be viewed through the viewing channel 140 of the slide element 100 when the slide element 100 is in the retracted position or in a partially retracted position. The bottom of the body element 110 is attached to the base 120. While this exemplary embodiment shows the side level 130 mounted on the base 110, those skilled in the art will understand that the side level 130 could also be mounted on the slide 100.

Figure 2:
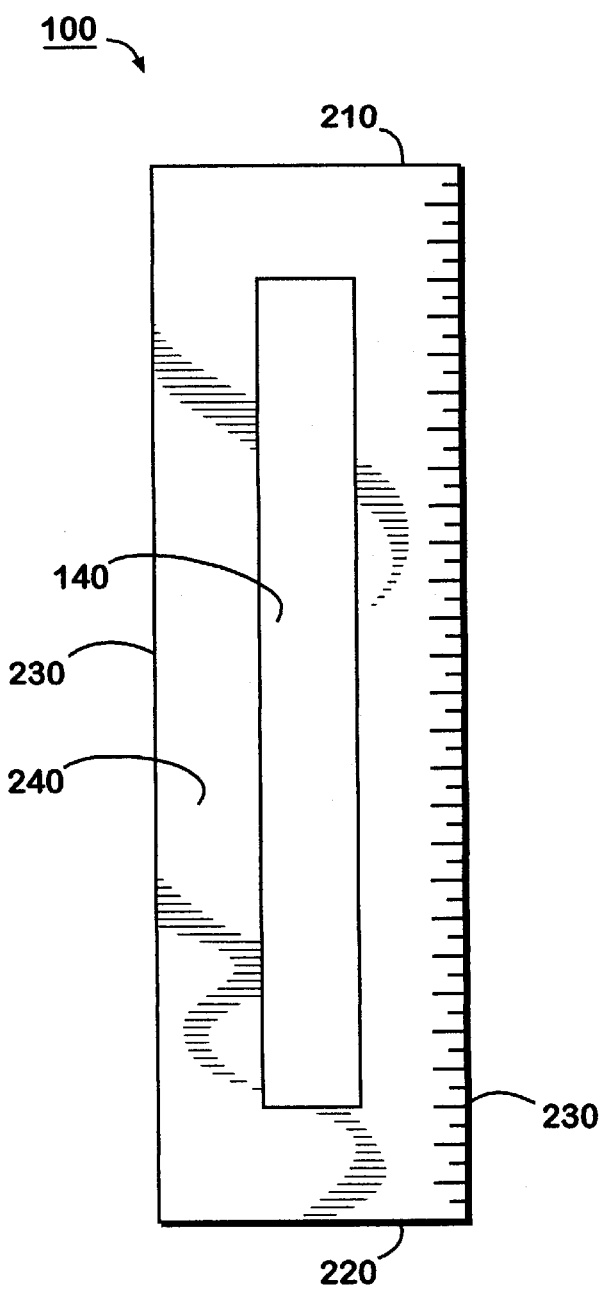
FIG. 2 is a drawing illustrating the front view of the slide element of an exemplary embodiment of the present invention.

FIG. 2 is a drawing illustrating a front view of the slide element 100 of an exemplary embodiment of the present invention. Measuring striations 200 extending the length of the slide element 100 are included on at least one of the elongated edges of the slide element 100. In one embodiment of the present invention, the slide element 100 is 4' 11⅞". As best shown in FIG. 1, when the slide element is fully retracted, the distance from the top of the slide element 100 to the bottom of the base 120 is 5' or 60". It is anticipated that other embodiments can be constructed of either greater or lesser lengths depending on the specific applications or intended uses of the various embodiments.

The width of the viewing channel 140 is approximately ¾" of an inch wide and the length of the viewing channel 140 approximately extends the length of the slide element 100 less a border on the top end and the bottom end of the slide element 100.

Figure 3A:
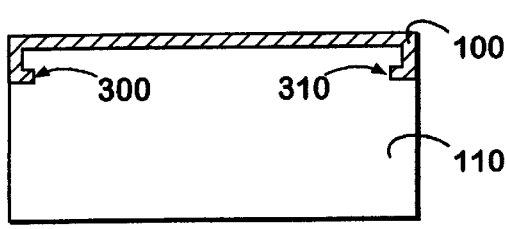
FIGS. 3A, 3B and 3C illustrate three possible techniques for slideably mounting the slide element.
Figure 3B:
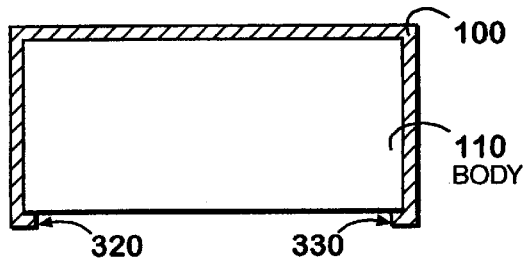
Figure 3C:
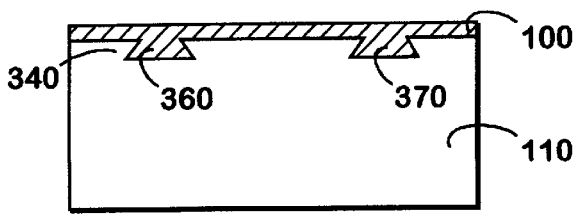

FIGS. 3A, 3B and 3C illustrates three possible techniques for slideably mounting the slide element 100 to the body element 110. In FIG. 3A, the slide element 100 is substantially C shaped with two protruding fingers 300 and 310 extending into the concave portion of the C shape. Each side of the body element 110 includes an indentation for receiving the protruding fingers 300 or 310 of the slide element 100, The protruding fingers 300 and 310 are slid into the respective indentations of the body element 110, thereby slideably mounting the slide element 100 to the body element 110.

In FIG. 3B, the slide element 100 is substantially C shaped. However, in this configuration protruding fingers 320 and 330 extend behind the back of the body element 110 and hold the slide element 100 to the body element 110.

In FIG. 3C, the underside surface of the slide element 100 includes two parallel trapezoidal shaped rails 340 and 350 running the length of the slide element 100. The narrow end of the trapezoidal shaped rails 340 and 350 are mounted to the underside of the slide element with the wide end of the trapezoidal shaped rails 340 and 350 extending away from the underside surface. The body element 110 includes two trapezoidal shaped channels 360 and 370 for receiving the trapezoidal shaped rails 340 and 350 of the slide element. The front surface of the body element 110 coinciding with the narrow portion of the trapezoidal shaped channel 360 and 370 with the wide end of the trapezoidal shaped channel 360 and 370 extending below the surface of the body element 110. The wide portion of the trapezoidal rails 340 and 350 extend into the trapezoidal shaped channel 360 and 370 of the body element 110 thereby slideably mounting the slide element 100 to the body element 110. While trapezoidal shaped rails are shown in the exemplary embodiment of view 3 of FIG. 3, it should be noted that rails of various geometric shapes could be used provided that these shapes taper our cut inward from the far side of the shape to the fixed portion of the tape.

These shapes include, but are not limited to, L shapes, T shapes, hook shapes, circular shapes, elliptical shapes, hex shapes, etc. In addition, any number of rail/channel configurations could be used, i.e., a single rail and a single channel, three rails and three channels. In the remaining figures, the exemplary embodiment will be shown as including the configuration depicted in view 3 of FIG. 3, however, those skilled in the art will understand that any of the disclosed techniques, or other techniques could also be used.

Figure 4:
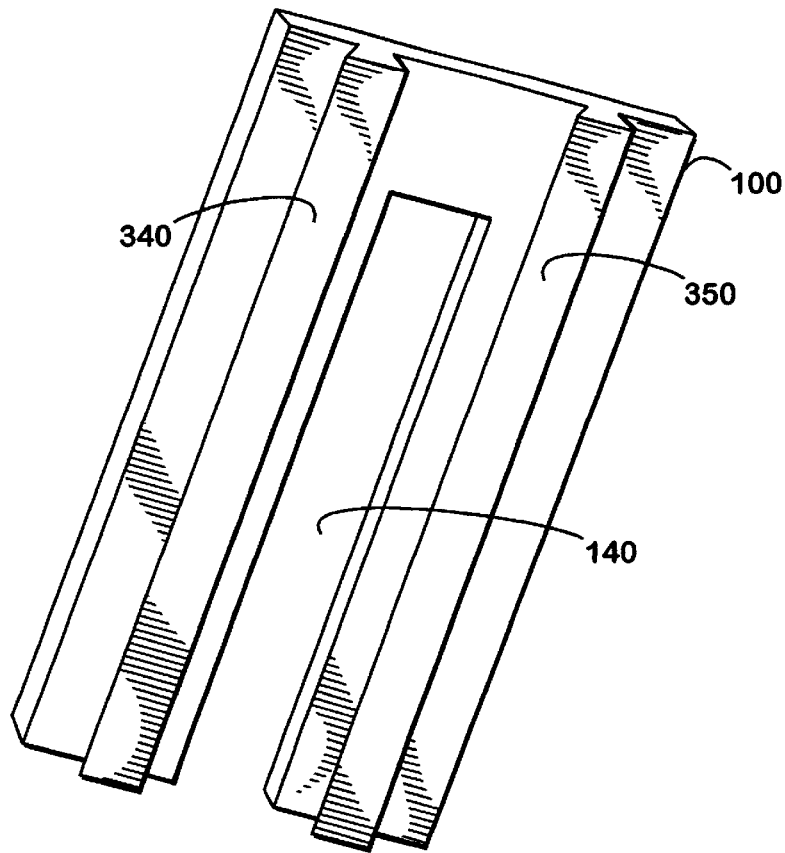
FIG. 4 is a drawing illustrating the rear view of the slide element of an exemplary embodiment of the present invention.

FIG. 4 is a drawing illustrating the rear view of the slide element 100 of an exemplary embodiment of the present invention. The trapezoidal shaped rails 360 and 370 or runners are shown in relationship to the slide element 100 and the viewing channel 140.

Figure 5A:
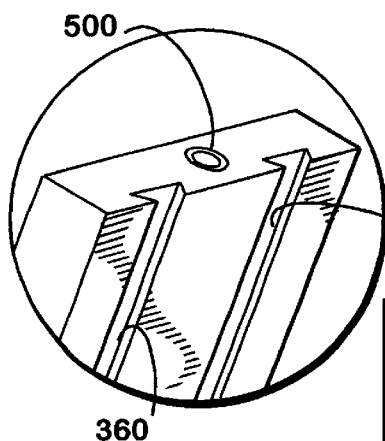
FIG. 5A is a perspective view of the top of the body element of an exemplary embodiment of the present invention.
Figure 5:
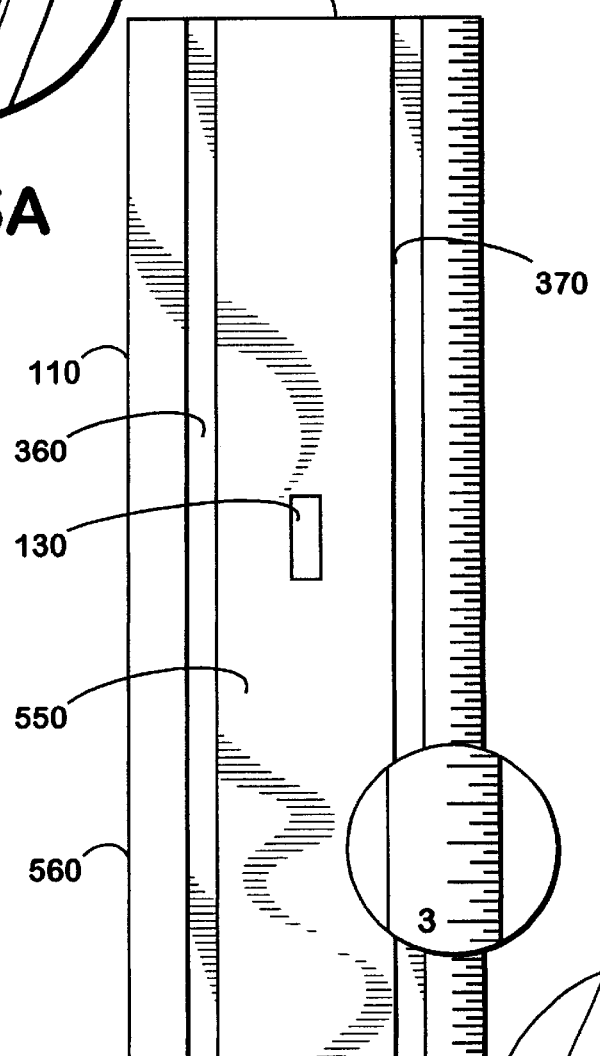
FIG. 5 is a the front view, of the body element of an exemplary embodiment of the present invention.

FIG. 5 is a drawing illustrating the front view of the body element 110 of an exemplary embodiment of the present invention. As previously described, the body element 110 is rectangular shaped and extends substantially 5' in a first direction and 2½" in a second direction. At least one of the elongated edges of the body element 110 includes a series of measuring striations 200 extending substantially the length of the body element 110. A portion of the body element 110 near the top end is always covered by at least a portion of the slide element 100. Therefore, it is not necessary for the measuring striations 200 of the body element 110 to extend all the way to the top.

Figure 5B:
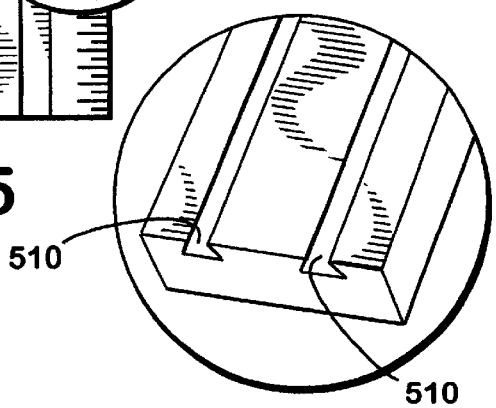
FIG. 5B is a perspective view of a fragmentary portion of the bottom of the body element of an exemplary embodiment of the present invention.

FIG. 5A also illustrates the top view of the body element 110 of an exemplary embodiment of the present invention. The top view includes a top level 500 that is fixedly mounted to the top of the body element 110. FIG. 5B also illustrates a bottom view of the body element 110 of an exemplary embodiment of the present invention. The bottom of the body element 110 includes a means for attaching the body element 110 to the base 120. In one embodiment screw holes 510 are provided for receiving screws that operate to fixedly attach the body element 110 to the base 120.

Figure 6:
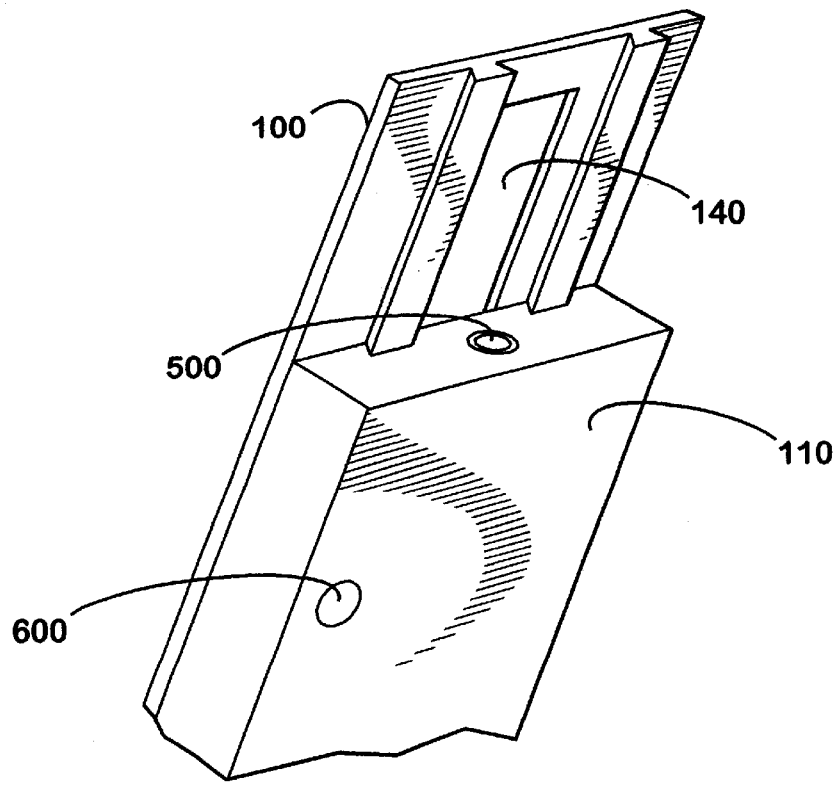
FIG. 6 is a perspective drawing illustrating the slide element and the body element of an exemplary embodiment of the present invention.

FIG. 6 is a perspective drawing illustrating the slide element 100 and the body element 110 of an exemplary embodiment of the present invention. In FIG. 6, the slide element 100 is shown as being partially extended. On the back side of the body element 110 a locking means 600 is illustrated for locking the slide 100 in place. In operation, the slide element 100 can be extended to a desired position and then locked in place by the locking means 600.

Figure 7:
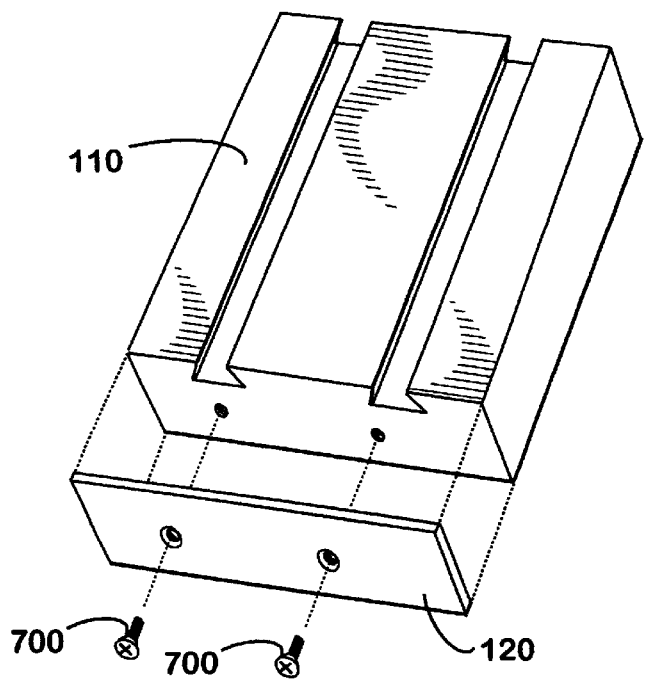
FIG. 7 is an exploded perspective view illustrating one means of attaching the base to the bottom of the body element.

FIG. 7 is an exploded perspective view one means of attaching the base 120 to the bottom of the body element 110. In this embodiment two mounting screws 700 are used to extend through the base 120 and into screw holes 510 provided on the bottom of the body element 110. The holes in the base 120 are counter sunk to allow screw heads to be flush with the bottom of the base 120. Those skilled in the art will understand that other methods may also be employed for attaching the base to the body element 110 including, but not limited to, clamps, adhesives, or the like.

Figure 8:
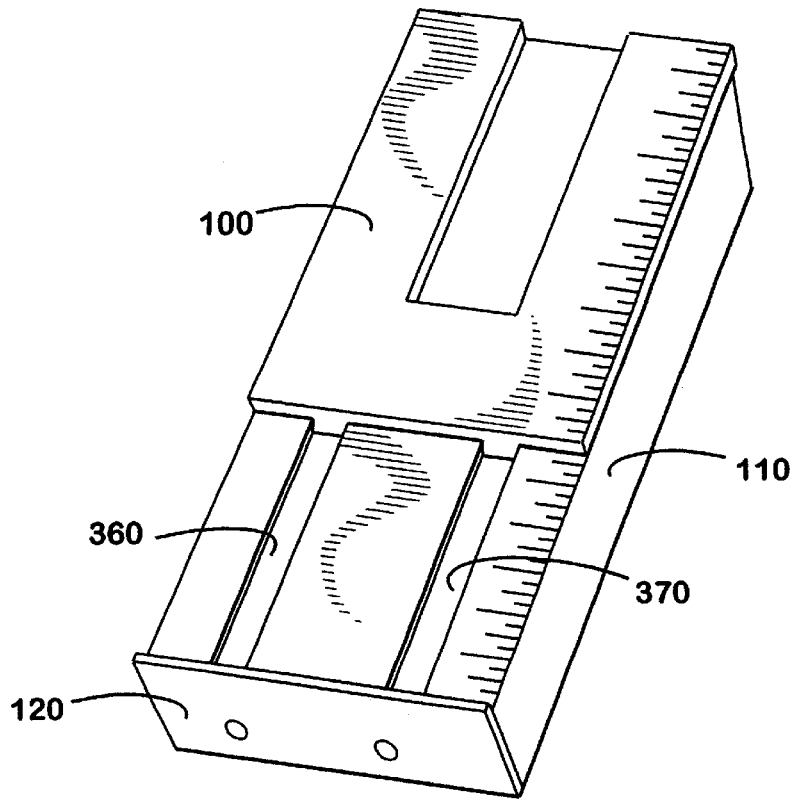
FIG. 8 is a perspective drawing illustrating the bottom portion of an exemplary embodiment of the present invention.

FIG. 8 is a perspective drawing illustrating the bottom portion of an exemplary embodiment of the present invention. The slide element 100 is shown as being in a partially extended position in relationship to the body element 110.

Figure 9:
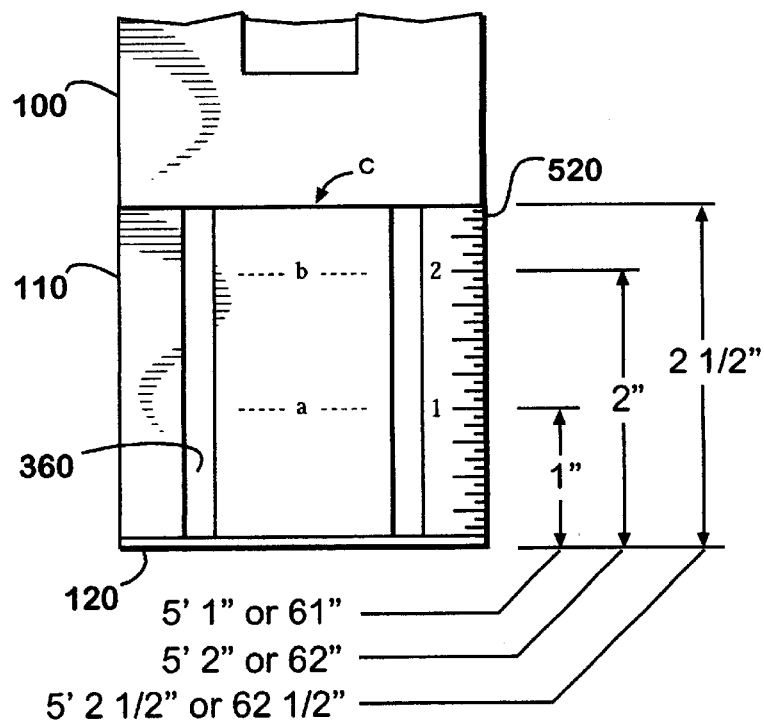
FIG. 9 is a fragmentary elevation illustrating the measuring feature of the exemplary embodiment of the present invention.

FIG. 9 is a drawing illustrating the measuring feature of the exemplary embodiment of the present invention. In operation, the base 120 of the exemplary embodiment is placed on a first surface (i.e., the ground or the floor). The slide element 100 is then extended upwards until the top of the slide element 100 contacts a second surface (i.e., the ceiling or a joist). The side level 130 and the top level 500 are viewed and the position of the exemplary embodiment is adjusted until the levels indicate that the exemplary embodiment is level or plumb. At this point, additional pressure is applied to the slide element 100 to ensure stability from the top of the slide element 100 to the bottom of the base 120. The locking means 600 is then actuated to secure the relative position of the slide element 100 to the body element 110.

By viewing the measuring striations on the body element, the distance between the bottom of the base 120 and the top of the slide element 100 can be determined. This determination is made by adding the 5' or 60" included in the length of the slide element 100 and the base 120 to the value indicated by the measuring striations 520 of the body element 110 just below the bottom of the slide element 100. In FIG. 9 the slide element 100 is shown being extracted in position c. In position c, the distance from the top of the slide element 100 (not shown in FIG. 9) to the bottom of the base 120 is shown as being 5'½" or 62½". This measurement is determined by adding the 50" for the slide element 100 and the base 120 to the 2½" indicated by the measuring striations 520 of the body 110 at position c. Similarly, at position b, the distance from the top of the slide element 100 to the bottom of the base 120 is 62 inches and at position a is 61". In one embodiment the slide element 100 can extend so that the total length that can be measured is 9'; however, those skilled in the art will realize that this invention can be constructed of even longer lengths.

FIGS. 10A and 10B are drawings illustrating the operation of an exemplary embodiment of the present invention. In FIG. 10A, the exemplary embodiment is shown in the closed or the fully retracted position. In FIG. 10B, the exemplary embodiment is shown in a partially extended position or opened. As shown in FIG. 10B, the base 120 protrudes approximately ⅛ of an inch past the front surface of the body 110 to allow for flush accurate readings from point A at the bottom of the base to point B at the top of the slide. This configuration advantageously allows the outer side portion of the slide element 100 and the edge of the base 120 that shares the same plane as the outer side of the slide element 100 to fit flush against a single surface.

FIG. 11 is a drawing illustrating an exemplary embodiment of the present invention being used as a plumbing device and a measuring device between a ceiling and a floor. The outside corner of the base plate 1100 is shown as being placed into a corner formed by the wall and the floor. The slide element 100 of the exemplary embodiment 1110 is extended so as to be flush with the ceiling.

FIG. 11A is a fragmentary perspective view of the bottom portion of this configuration.

Figure 12:
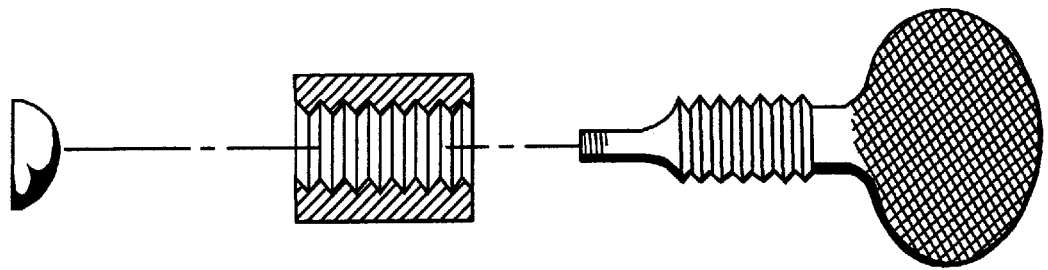
FIG. 12 is an exploded elevated view, partially sectioned, of the components of an exemplary embodiment of the locking means for an exemplary embodiment of the present invention.

FIG. 12 is a drawing illustrating the components of an exemplary embodiment of the locking means for an exemplary embodiment of the present invention. The exemplary lock 600 is shown as including a swivel 1220, a sleeve 1200, and a bolt 1210. Those skilled in the art will realize that other locks, such as clamps, keys, latches, springs or bolts, may be used in place of the exemplary lock.

Figure 13:
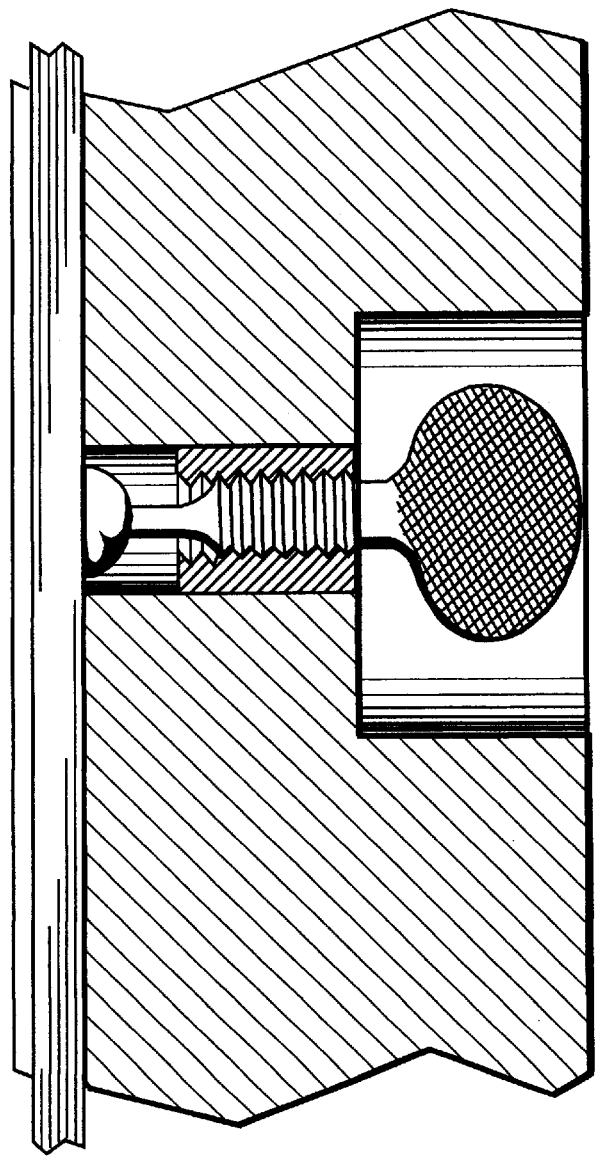
FIG. 13 is a partial cross-sectional view illustrating an exemplary embodiment of the present invention including the exemplary locking means.

FIG. 13 is a cross-sectional view an exemplary embodiment of the present invention including the exemplary lock 600. The sleeve 1200 is installed in a narrow channel extending from the front edge to the back edge of the body element 110. The sleeve 1200 is internally threaded and is able to receive the bolt 1210. The bolt 1210 extends from the backside of the body element 110 and through the sleeve 1200 to approximately the front surface of the body element 110. The swivel 1220 is placed at the end of the bolt 1210. In operation, the bolt 1210 can be rotated in a first direction to force the swivel 1220 against the underside of the slide element 100. This operates to frictionally fix the slide element 100 in position in relationship to the body element 110. Rotating the bolt 1210 in a second direction retracts the swivel 1220 and allows the slide element 100 to freely move in relationship to the body element 110.

Although the present invention has been described in various embodiments having various measurements and shapes, it should be understood that the present invention is not limited to any particular shape or size. On the contrary, the use of two slideably mounted measuring devices and a leveling means to ensure that the measuring devices are level is all that is necessary for an embodiment of the present invention.

We claim:

1. An apparatus for measuring and plumbing comprising:
    a substantially C-shaped slide element defining an enclosed viewing channel therethrough and having at least one protruding finger;
    a body element having an indention for receiving said protruding finger, slidably attached to said slide element to permit said slide element to slide relative to said body element between a retracted position and an extended position;
    a base element attached to one end of said body element;
    a first level fixed to a front surface of said body element, said first level on said body element capable of being viewed in said viewing channel of said slide element; and
    a second level fixed to a top surface of said body element.

2. The apparatus of claim 1 wherein said slide element is substantially C-shaped and said body element is held within said slide element by said body element being entirely within the concave portion of said C shaped slide element.

3. The apparatus of claim 1 wherein said apparatus is made entirely or in part of a material selected from the group consisting of steel, iron, aluminum, plastic and composite.

4. The apparatus of claim 1 wherein said slide element has measuring striations and wherein said base element has measuring striations.

5. The apparatus of claim 1 further comprising a lock for mantaining a given position of the slide element relative to the body element.

6. An apparatus for measuring and plumbing comprising:
    a substantially C-shaped slide element having at least one protruding finger;
    a body element having an indention for receiving said protruding finger, slidably attached to said body element, and said body element held within said slide element by said body element being within the concave portion of said slide element;

a base element attached to one end of said body element;

a side level fixed to said slide element; and a top level fixed to said slide element.

7. The apparatus of claim 6 wherein said apparatus is made entirely or in part of a material selected from the group consisting of steel, iron, aluminum, plastic and composite.

8. The apparatus of claim 6 wherein said slide element has measuring striations and wherein said base element has measuring striations.

9. The appartus of claim 6 further comprising a lock for mantaining a given position of the slide element relative to the body element.

* * * * *